US012758863B2

(12) United States Patent
Foxcroft

(10) Patent No.: US 12,758,863 B2
(45) Date of Patent: Oct. 13, 2026

(54) VIRTUAL REALITY FOOTWEAR LOCOMOTION SYSTEM

(71) Applicant: Freeaim Technologies Limited, Amersham (GB)

(72) Inventor: Ashley Martin Foxcroft, Amersham (GB)

(73) Assignee: Freeaim Technologies Limited, Amersham (GB)

( * ) Notice: Subject to any disclaimer, the term of this patent is extended or adjusted under 35 U.S.C. 154(b) by 277 days.

(21) Appl. No.: 18/683,088

(22) PCT Filed: Aug. 10, 2022

(86) PCT No.: PCT/EP2022/072474

§ 371 (c)(1),
(2) Date: Feb. 12, 2024

(87) PCT Pub. No.: WO2023/017091

PCT Pub. Date: Feb. 16, 2023

(65) Prior Publication Data

US 2024/0342588 A1 Oct. 17, 2024

(30) Foreign Application Priority Data

Aug. 12, 2021 (GB) ...................................... 2111576
Feb. 28, 2022 (GB) ...................................... 2202740

(51) Int. Cl.
*A63C 17/10* (2006.01)
*A63C 17/06* (2006.01)
(Continued)

(52) U.S. Cl.
CPC .......... *A63F 13/212* (2014.09); *A63C 17/064* (2013.01); *A63C 17/10* (2013.01);
(Continued)

(58) Field of Classification Search
CPC ....... A63C 17/10; A63C 17/12; A43B 3/0005; A43B 13/141
See application file for complete search history.

(56) References Cited

U.S. PATENT DOCUMENTS 6,059,062 A 5/2000 Staelin
11,584,455 B2 * 2/2023 Pikulski ............... B62D 51/001
(Continued)

FOREIGN PATENT DOCUMENTS

KR 101625591 B1 6/2016

OTHER PUBLICATIONS

International Search Report and Written Opinion issued for PCT/EP2022/072474, dated Dec. 1, 2022.
(Continued)

*Primary Examiner* — Marc Q Jimenez
*Assistant Examiner* — James J Triggs
(74) *Attorney, Agent, or Firm* — Westman, Champlin & Koehler, P.A.; Z. Peter Sawicki; Amanda M. Prose

(57) ABSTRACT

A footwear assembly for use in a virtual reality environment comprising a front platform portion having an upper surface adapted and configured for supporting and releasably retaining the forward part of a user's foot and a rear platform portion having an upper surface adapted and configured for supporting and releasably retaining a rear part of the user's foot, the front and rear platform portions being joined by a transverse hinge so that the platform portions can pivot relative to one another to accommodate flexing of the user's foot, each platform portion having mounted under a lower surface thereof at least one drive motor, each drive motor driving a continuous belt, and two continuous belts on each platform portion being arranged substantially in parallel, one located to each side of the platform portion, the drive motor or motors and continuous belts of the front platform portion
(Continued)

being mounted to a front drive module and the drive motor or motors and continuous belts of the rear platform portion mounted to a rear drive module, the drive modules being mounted beneath their respective platform portions so each drive module may rotate in the horizontal plane relative to the platform portion it is mounted beneath.

15 Claims, 6 Drawing Sheets

(51) Int. Cl.
*A63C 17/12* (2006.01)
*A63C 17/26* (2006.01)
*A63F 13/212* (2014.01)

(52) U.S. Cl.
CPC .............. *A63C 17/12* (2013.01); *A63C 17/26* (2013.01); *A63C 2203/12* (2013.01); *A63C 2203/18* (2013.01)

(56) References Cited

U.S. PATENT DOCUMENTS

| | | | | |
|---|---|---|---|---|
| 2003/0214103 | A1* | 11/2003 | Walker | A63C 17/1409 280/11.203 |
| 2013/0025955 | A1 | 1/2013 | Chavand | |
| 2014/0262576 | A1 | 9/2014 | Tuli | |
| 2015/0321339 | A1 | 11/2015 | Asbeck | |
| 2018/0326286 | A1 | 11/2018 | Rathi | |
| 2020/0197786 | A1 | 6/2020 | Artemev | |
| 2021/0015200 | A1* | 1/2021 | Tuli | A43B 13/141 |

OTHER PUBLICATIONS

Search Report issued for GB patent application serial No. GB2111576.1, dated Feb. 4, 2022.
Search Report issued for GB patent application serial No. GB2202740.3, dated Aug. 31, 2022.
Ekto VR <https://ektovr.com/> (2023) accessed Jan. 16, 2024.

* cited by examiner

VIRTUAL REALITY FOOTWEAR LOCOMOTION SYSTEM

CROSS-REFERENCE TO RELATED APPLICATION

This Application is a Section 371 National Stage Application of International Application No. PCT/EP2022/072474, filed Aug. 10, 2022, and published as WO2023/017091 A1 on Feb. 16, 2023, in English, which claims priority to GB patent application Serial No. 2111576.1, filed Aug. 12, 2021, and GB patent application Serial No. 2202740.3, filed Feb. 28, 2022, the contents of which are hereby incorporated by reference in their entirety.

FIELD OF THE INVENTION

The present invention relates to virtual reality (VR) footwear, that is, a shoe-like device which counteracts the walking movements of a person wearing the VR footwear, thereby allowing the wearer to move around in VR environments whilst the wearer actually remains in the same physical or real-life location, or within a predefined area.

BACKGROUND ART

VR systems (sometimes called augmented reality systems) generally generate a three-dimensional virtual environment, using devices such as goggles, helmets including a display, gloves fitted with sensors, screens, sound systems and the like. The devices contain sensors, data processors and communications devices to communicate with an external computing device which tracks the movements made by and inputs made to the devices, processes this data to make appropriate changes in the VR environment and outputs the associated data to the devices so that the devices can respond appropriately (for example by displaying a changed view in goggles, or by delivering a haptic response to be felt by or a sound to be heard by the user). When the user is immersed in the VR environment, the various devices allow interaction with that environment and virtual objects within that environment, and the wearer to move around in the virtual environment. VR systems exist within the physical, or real-life world, and so have physical boundaries and/or physical objects and features which could limit and/or impede the user's movement should movement in the virtual environment bring the wearer into contact with a physical limit, object or feature. A person wearing goggles which display a VR environment is usually blind to the physical environment, and there is therefore a risk that if the person's real-life movements across the ground are communicated to the system so as to replicate that movement in the virtual environment, the person could trip or bump into objects in the real world.

VR footwear has therefore been developed which counteract the walking or other movements over the ground of a person wearing the VR footwear, so enabling the wearer to stay in one safe spot, or within a safe area, while enjoying apparent motion in the VR environment during a VR game or other experience. One such apparatus is disclosed in US 2018/0326286; another has been designed by the private company Ekto VR, of Pittsburgh USA (see www.ektovr.com). Both of these start from the concept of a "powered roller skate" such as in US 2014/0262576 or U.S. Pat. No. 6,059,062, in which powered footwear is used to transport a person wearing the footwear and essentially reverse it to apply the concept to the VR environment. Position sensors, gyroscopes, processors and computing devices and communications devices in the footwear work in combination with the external computing device of the VR system and the locomotory features of powered roller skates (motors, wheels, belts, etc.) to sense the mechanical walking action of the person wearing the footwear and to counteract or negate it, so that although the person carries out the real-life actions of walking, running, jumping, etc. those actions are rendered ineffective and the person remains in the same physical position or area. Thus the wearer of such footwear in these systems will expend physical effort as if moving, while the actions taken by the systems to keep the person in the same physical location can be sensed and utilised by the system so as to transfer the person's real-life movements and replicate them in the VR environment. Both of the known systems accommodate the natural flexure of the foot during normal walking motion, and they can be arranged so as to minimise motion sickness. The present invention is a development of these known concepts.

One problem with known VR footwear is that it is inefficient at dealing with physical movement of the wearer's feet in anything other than the straight ahead or longitudinal direction; people do not only walk with their feet exactly longitudinally, they sidestep and the flexibility of the ankle joint allows the foot to swivel and the person to walk at an angle sideways, transversely, in a rearwards direction or in curved paths, and conventional VR footwear is not good at rapidly accommodating these non-longitudinal or turning movements. Another problem is that they can be excessively tall, so that the wearer feels as if they are walking on high, platform soled shoes; this makes for an unnatural "feel" to the wearer, is uncomfortable, affects the ability of the wearer to balance properly and risks the wearer tripping and falling. They are also often heavy, bulky, mechanically complicated and expensive to manufacture. The footwear disclosed in US 2018/0326286 appears to be able only to compensate for walking in a forwards/rearwards direction in a VR environment, and does not describe or explain how the footwear might compensate for sideways steps (despite referring to a "return zone", which is illustrated as a circle on the ground). The Ekto VR system appears to compensate for sideways movement as well as forward/rearward movement, and achieves this by having multiple powered caster wheels; however, this results in footwear which is tall, heavy, and significantly broader than the human foot, and such broad footwear is difficult to walk in until sufficiently acclimatised to the breadth.

To explain some of the directional terminology as used herein we refer to the anatomy of a human, which may be defined by three orthogonal planes:

1. a sagittal (or longitudinal) plane which divides the body into right and left parts, and extends forwardly, rearwardly and vertically relative to the user,
2. a coronal (or frontal) plane that divides the body into front and rear parts, and extends to the left, the right and vertically relative to the user, and
3. a horizontal, axial or transverse plane which divides the body into top and bottom parts, and extends forwardly, rearwardly and to the left and the right relative to the user.

The terms "forward", "front", "back" and "rear" and like or related terms used herein should generally be interpreted in relation to the sagittal plane of the user of the footwear, terms such as "left", "right", "transverse" and like or related terms used herein should be interpreted in relation to the coronal plane of the wearer of the footwear, and terms such as "up", "down", "above", "below" and like or related terms used herein should be interpreted in relation to the horizontal plane of the wearer of the footwear. It should also be noted that, although when walking a person's feet are usually aligned with the body and operate in the longitudinal plane, the ankle joint also allows the foot to rotate about the lower leg so that the foot is no longer aligned longitudinally relative to the user's; in this case the directional terms should be construed as relating to the foot of the wearer and to the footwear itself—and in particular to the parts of the footwear which are in close contact with the wearer's foot.

SUMMARY OF THE INVENTION

The present invention is predicated on the realisation that an existing means of propulsion addresses many of the problems of conventional VR footwear and provides additional advantages.

The present invention therefore provides a footwear assembly for use in a virtual reality environment comprising a front platform portion having an upper surface adapted and configured for supporting and releasably retaining the forward part of a user's foot and a rear platform portion having an upper surface adapted and configured for supporting and releasably retaining a rear part of the user's foot, the front and rear platform portions being joined by a transverse hinge so that the platform portions can pivot relative to one another in the longitudinal plane to accommodate flexing of the user's foot as this occurs in walking, in which each platform portion has mounted to a lower surface thereof at least one drive motor, each drive motor driving a continuous belt, and two continuous belts on each platform portion being arranged substantially in parallel, one located to each side of the platform portion, and in which the drive motor or motors and continuous belts of the front platform portion are mounted to a front drive module and the drive motor or motors and continuous belts of the rear platform portion are mounted to a rear drive module, the drive modules being mounted beneath their respective platform portions so each drive module may rotate in the horizontal plane relative to the platform portion it is mounted beneath.

With such an arrangement there are two separate continuous belts on each side of the assembly, arranged front-to-rear, the continuous belts operating in the same way as do caterpillar tracks or tank tracks, and which can allow a degree of turning in the same manner as do caterpillar tracks, but the relatively short length of each "track" (in use, the length of the front and rear platform portions together is preferably approximately the same as that of a large human foot with each "track" being no more than about half the length of a foot) allows this to a greater extent than could a system which uses belts of the same length as a foot (such as the system in US 2018/0326286).

There may be two motors in each drive module, each motor driving one continuous belt; the use of four driven continuous belts beneath a user's foot means that the driving forces for the compensatory movements as the user walks wearing the assembly can be split between four motors (two in each module), which allows the motors to be smaller than if there were only a single motor per module and also, if the motors are independently controlled, allows the assembly better to adapt to and compensate for variations in distribution of bodyweight along and across the foot during both normal walking in a forward direction and also in sidestepping, sideways or turning movements. Independent control of the motors also facilitates a reduction in motion sickness inducing effects, as will be described below. Finally, such an arrangement permits a very compact and low-height assembly, as will be seen in the embodiment described below. The hinge, as in US 2018/0326286, allows for the normal flexing of the user's foot (at the ball of the foot, between the toes and the heel) when walking in a forward direction. The word "substantially" is used deliberately above, to accommodate the fact that, as in caterpillar tracks, when the belts are used to compensate for turning or lateral movements, this can be assisted by allowing a certain amount of temporary flexing and/or transverse movement of a belt along its length during which the two belts are temporarily not aligned in parallel. It will be understood that there could be only one motor to drive both continuous belts in a module, and also that the footwear assembly could easily be configured to be used by a user with or without outer footwear, and the word "foot" used herein should be construed accordingly.

Allowing the drive modules to rotate relative to the platforms and the foot the platforms support improves the maneuverability of the assembly and hence its ability to compensate for a broad range of possible foot movements by the user/wearer of the assembly, including sidesteps, steps at an angle to the forward direction, and steps in which the direction of the foot changes mid-step (i.e. turning).

Preferably there is a front turn motor adapted to selectively rotate the front drive module relative to the front platform portion and a rear turn motor adapted to selectively rotate the rear drive module relative to the rear platform portion. The turn motors may be adapted to drive the two drive modules to rotate so that they remain aligned and parallel as they rotate, or so that they rotate in the same direction but at different rates, or so that they rotate in different directions and/or at different rates; this allows for maximum adaptability to the range of possible movements a user may make, whilst being controllable so as to minimise potential motion sickness effects. The rotational movement of the drive modules may be constrained to a maximum of 90° in either direction from the longitudinal plane; this is advantageous because it means that power and control can be easily achieved by wires/cables without fear of tangling or catching, and the turn motors only need to turn each drive module through a total of 180°. The drive motors could be operable in two directions so as to effectively provide for 360° of movement of the drive modules. The turn motors may be stepper motors or they could be geared DC motors (otherwise known as servos), with either being coupled to a position sensor; these are easily adapted, through suitable gear movements, to provide a controlled degree of indexed rotary movement, whilst supporting a person's bodyweight, the index movement permitting straightforward calculation of the compensatory effect each step would have on the actual movement of the user's foot.

The continuous belts may be of the same length, and the motors may be located within a continuous belt. The motors may drive a continuous belt either directly, by acting on one of two pulley wheels between which the continuous belt stretches, or indirectly by way of a motor which drives a primary belt which engages with one of the two pulley wheels; the primary belt is preferably smaller (in width and length) than the continuous belts. Providing equal length belts gives improved weight and load capability, and increases the lifespan of the apparatus, it also simplifies the design and reduces the number of different consumable components needed for long term maintenance of the apparatus. Preferably, when the continuous belts are of equal length, the motors drive the primary belt via a splined wheel which is coaxial with the motor, so that the motor and the associated primary belt can be located on opposite sides of the drive module so that they can fit within the continuous belts. Locating the motors inside the belts protects them from damage, as does locating the primary belt within the continuous belt, and locating the motor and the splined wheel on opposite sides of the drive module helps distribute and/or equalise the forces exerted on the apparatus in use whilst enabling an overall compact size and configuration.

The continuous belts on each module may be of different lengths. This may be thought to be an undesirable or unnecessary feature, because it suggests that the belts on opposite sides of each module have different surface areas in contact with the ground surface and therefore less grip/traction to transmit the driving motion; however, the actual contact area that matters is the part of the belt immediately underneath the drive wheels and drive pulleys, because these press the belt beneath them against the ground surface. The middle part of each belt between the drive wheels does not contribute significantly to the traction/grip because it is not pressed as firmly against the ground surface as that sandwiched between the ground and the drive wheels/pulleys. Having one belt longer than its pair on the other side of the module also allows the motors to extend fully across the module (from one side of the module to the other side of the module), but for the motor of the shorter belt to be located within longer belt, which permits the overall design to be very compact in the horizontal plane, not substantially more than a large footprint, and not excessively tall.

The shorter continuous track under the front platform portion may be aligned longitudinally on the same side of the front platform portion as the longer continuous belts under the rear platform portion, and vice versa. This ensures that, in forward walking at least, differences between bodyweight support and frictional engagement by the different length belts can be evened out transversely; this may be assisted by giving the longer belt a surface having a greater friction coefficient than the shorter belt.

Each continuous belt may extend between at least one drive wheel having axial ribs and at least one pulley wheel having axial ribs, an inner surface of each continuous belt may have transverse ribs which are complementary to the ribs on the drive wheel and pulley wheel, and the inner surface of the continuous belt may have a rib extending longitudinally over substantially the entire inner surface of the belt. Such an arrangement can be used to limit the amount of transverse movement of the belts relative to the drive/pulley wheels and prevent the belt disengaging therefrom. Circumferential channels can be provided in the drive wheel and the pulley wheel, the longitudinal rib being located and configured so as to fit within these channels, so that the belt is retained against transverse disengagement. Additionally or alternatively the or each drive wheel and/or the or each pulley wheel is formed of a pair of separate, axially-spaced ribbed wheels, the axial spacing of the or each pair of wheels providing the same effect as the circumferential channels described above. Preferably the transverse size of the longitudinal rib is less than the axial size of the circumferential channels; this allows some lateral movement of the belt (which is good for turning) but limits it (which reduces the risk of the belt disengaging).

Preferably the drive motors are brushless DC electric motors. These are compact, reliable, and capable of providing high torques suitable for applying the forces and speeds/accelerations which are required to compensate for the movements of a person (up to about 100 kg, say) in a manner which reduces the risk of motion sickness.

A system for use in a virtual reality environment may comprise a pair of footwear assemblies described above, with each footwear assembly comprising a transmitter/receiver for transferring data between assemblies and/or between the assemblies and an external VR environment computer. Each assembly would have its own power supply, located either behind the wearer's heel (as in US 2018/0326286) or within one or both of the modules of each assembly and/or within the chassis to which the modules are mounted. There may be a processor in the external VR environment computer for handling and manipulating the data, and/or processors may be provided in each footwear assembly for distributing these functions.

The system may be adapted to calculate a correction vector representing the distance and direction between the actual coordinate of the centre of the user's body and the origin (starting position) coordinate at least once for every stride (or single step) made by each foot. The system may be adapted to utilise the correction vector and the actual heading of each VR footwear assembly to calculate a rotation angle of each drive module and to adjust the speed of the drive motors (faster or slower than user's actual walking speed) in order to gradually return the user to the user's original starting position. The system may be adapted to combine positional data from both footwear assemblies to determine their heading/direction relative to the user's body (torso), and to use this heading for direction control within the VR environment and/or for positional correction. This is advantageous because no additional electronics and sensors need be attached to the user's body, thereby reducing cost and complexity.

BRIEF DESCRIPTION OF THE DRAWINGS

The invention will now be described by way of example and with reference to the accompanying figures, in which.

DETAILED DESCRIPTION OF THE EMBODIMENTS

The present invention is concerned with products for Virtual Reality (VR) that aim to solve one of the biggest problems with current technology: that is natural and unrestricted 'Walking in VR'. Generally, these products are known as VR locomotion systems. Current VR technology limits the user to the confines of a small 'clear area' within their homes, usually a living-room or office. The user can take a few steps but will soon reach the boundary of their play area, this is often described as 'immersion breaking' and is an annoyance to the user in what is otherwise a great experience. The challenge is to create a technological solution that can allow a user to walk normally, as well as stopping, turning etc, but prevent the user from physically moving outside a small area (~1.1×1.1 m). When combined with a VR headset, the user will experience change in speed and direction within a virtual environment. Some known VR locomotion systems only provide forwards/backwards movement; the present invention is capable of omni-directional movement and positional correction.

Figure 1A:
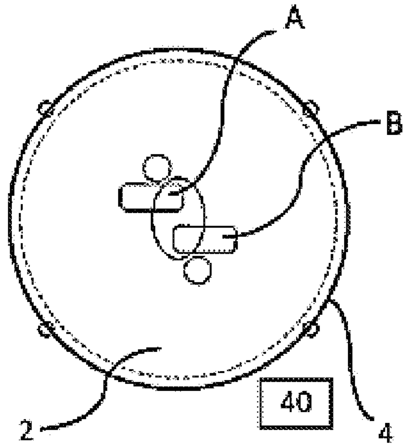
FIGS. 1(*a*) and 1(*b*) illustrate the operation of a VR environment locomotion system.

FIG. 1*a* shows in plan view how a VR locomotion system operates. A user starts with their feet in or attached to VR footwear assemblies A and B in the centre of the play area 2, inside a protective boundary provided by a safety barrier 4. No special floor type is required for the device to function correctly, although a protective floor mat may be recommended in certain circumstances. While the footwear assemblies are unpowered or in standby mode, the user can walk as normal; the VR footwear assemblies will not roll or move. When ready the user activates the VR footwear assemblies using an in-game menu stored in the VR environment external computer 40 (the menu is displayed on a screen inside the VR headset worn by the user (not shown) which is visible to the user), or via a switch on a handheld controller (not shown) operated by the user. The user then starts walking in a normal way, by lifting and placing one foot forward. If the user simply raises the foot and places it back down without covering a distance, no movement will occur. When the user moves position such as by walking, the actual movement is sensed; using sensors and motors, the user's speed is matched and the inverse movement is performed by the VR footwear assemblies with very low latency to avoid motion sickness. The user can gradually stop at any time when both feet are on the ground, or other conditions are met such as when the distance travelled has been matched by the VR footwear assemblies. The user can also command a safe stop by using a stop button in the in-game menu (usually always present in view), or a physical stop button on the user's handheld controller. Additionally or alternatively there could be a voice-operated stop/start feature.

Figure 1B:
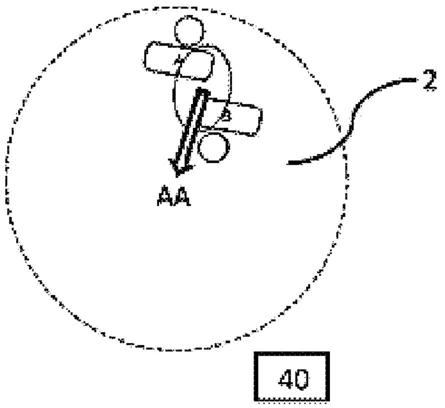

After activating the system and after a period of movement by the user (several seconds or minutes, for example), the user may have stopped, changed direction and started walking again, or taken side steps. Over time, this will cause the user to drift away from the centre of the play area, as shown in FIG. 1*b*. The system must be capable of making corrections to the user's actual physical location, so as to return the user to the centre of the play area 2. As shown in FIG. 1*b*, the correction vector shown by the arrow AA is applied to return the footwear assemblies to their starting position. Depending on the heading/direction of the user, correctional movements may be lateral (side-ways), or adjustments to the forward walking speed (faster/slower), or a combination of these. Any lateral movements should be significantly slower than the forward/backwards movement of the user (which typically is up to 1.2 m/s), and the acceleration/deceleration should also be gradual; this is to avoid the user feeling the lateral compensatory movements, which may lead to a feeling of instability, and/or to motion sickness.

Outline Operation of the VR Footwear Assemblies in the Locomotion System

As the user walks in the forward direction, when either of the VR footwear assemblies is lifted off the ground, the opposite VR footwear assembly performs the inverse movement. High torque Brushless DC (BLDC) Motors provide a low latency response rate and PID control ensures the desired speed is achieved rapidly as load changes. Both VR footwear assemblies communicate wirelessly using a radio link such as Bluetooth, Wi-Fi, or generic packet radio for digital transmission. This is configured to relay a constant stream of data between each VR footwear assembly and a central controller, which also connects to a computer 40 (see FIGS. 1*a* and 1*b*). Custom C++ Windows drivers interface with the SteamVR Input API, which allows the speed and direction data to be used in VR games and applications. Each VR footwear assembly takes measurements from a number of sensors, that allow for accurate and repeatable measurements of x & y distance moved on the play area surface 2 from the start position and of the angular direction of each foot. These sensors are designed to function regardless of whether the VR footwear assembly is on the floor or raised in the air while the user walks.

To provide compensatory movements in all directions, not just forwards/backwards, each VR footwear assembly has two motor drive modules (front and rear) which independently rotate 180°, or +90° to −90° around a centre position. Rotating these drive modules allows lateral (sideways) movement to occur. The magnitude of the lateral movement depends on the angle at which the two drive modules are rotated, for example +/−90° would result in full sideways movement and zero forward movement, whereas +5° would result in substantial forwards/backwards movement while at the same time a small lateral movement. The resulting vector of distance and direction depends on the speed of drive motors and drive module angle, which is determined by a control system for walking and positional correction. This closed loop control system receives inputs from number of sensors, including but not limited to optical, magnetic, MEMSs accelerometers, magnetometers and gyroscopes. The control system outputs signals to control drive motors and turn motors, as well as speed and direction data which is sent to the VR environment computer.

In addition to the BLDC motors, there are also turn motors embedded within the central part of each drive module that provide the rotation through a set of gears. The turn motors may be stepper motors or geared DC motors (also known as servos). The geared attachment mechanism allows wires to pass through from the rotating drive module to the electronics housing in the middle section of each VR footwear assembly. There is also a position feedback sensor coupled to the rotation motors either directly or by a gear, which allows measurement and precise control of the rotation angle. The absolute rotation angle can be determined, allowing the centre position (0°) to be found and the correct position to be verified during operation.

Each VR footwear assembly tracks its own location on a two dimensional surface (environment floor) using optical sensors. No tracking sensor devices external to the VR footwear assemblies are required in order to track the position of the VR footwear assemblies. Sensors detect when each VR footwear is lifted off the surface, by means of optical sensors, acceleration sensors or mechanical contacts switches. The speed of each drive motor is measured using magnetic or optical based sensors attached or integrated into each motor. The surface tracking is based on a relative coordinate system, where the centre of the user's play area is the origin (e.g. 0,0) and may be determined by the starting position or otherwise configured by the VR environment computer. The user's actual position and direction (or heading) is determined from sensors on each VR footwear assembly and transmitted between each VR footwear assembly, and/or to an external processing device or VR environment computer.

The external processing device or VR environment computer calculates a correction vector at least once for every stride (or single step) made by each foot. This correction vector represents the distance and direction between the actual coordinate of the user's body centre and the origin (starting position) coordinate. The correction vector and the actual heading of each VR footwear assembly are used to calculate the rotation angle of each drive module and to adjust the speed of the drive motors (faster/slower than user's actual walking speed) in order to correct the user's position over time.

Embodiments of the Invention

Figure 2:
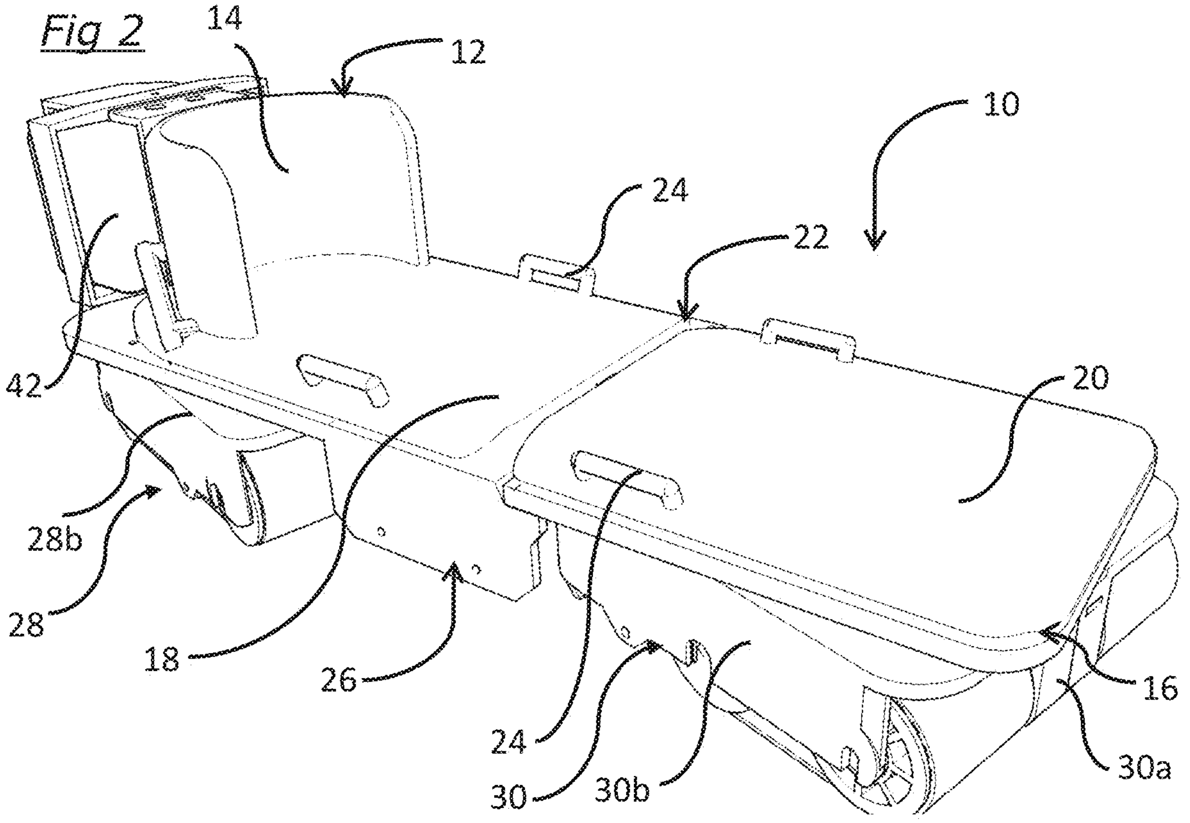
FIG. 2 is a perspective view of a first embodiment of a VR footwear assembly in accordance with the present invention.

FIG. 2 shows a schematic view of an embodiment of a footwear assembly 10 in accordance with this invention. It is sized and configured to receive a human foot, with a rear end 12 provided with a heel cup or guard 14, and a front end 16; the footwear assembly 10 has a flexible upper platform in two parts, a rear platform 18 towards the rear end 12 and a front platform 20 towards the front end 16. There is a transverse hinge 22 (shown more clearly in FIGS. 5 and 6), the arrangement being such that the rear platform 18 and heel guard 14 are adapted to receive the rear part of a human foot and the heel, respectively, while the front platform 20 is adapted to receive the front part of the foot, with the hinge 22 being located so that the footwear assembly can hinge at the ball of the foot, where the human foot typically flexes when walking. Brackets 24 are provided for straps or the like (not shown) to pass over the foot to hold the foot firmly in place on the platforms. The heel guard 14 may be adjustable relative to the rear end 12 so as to accommodate feet of different sizes. In use when a user is "wearing" the footwear assemblies and standing stationary, the two platforms 18, 20 are substantially horizontal.

Beneath the flexible platforms 18, 20 is a rigid chassis 26, which bends at the transverse hinge 22 and to which are mounted two independently rotatable drive modules, a rear drive module 28 and a front drive module 30. Each drive module 28, 30 has a rigid drive frame 28*a* (see FIG. 3*a*), 30*a*, a drive frame cover 28*b*, 30*b*, and on its lower surface two drive belts, described below in relation to FIG. 3. FIG. 2 shows the front and rear drive modules 30, 28 both rotated to the right (relative to the front end 16) by the same amount (however it should be appreciated that the directions and amounts of rotation could differ for some applications or to compensate for some kinds of movement.

Figure 3A:
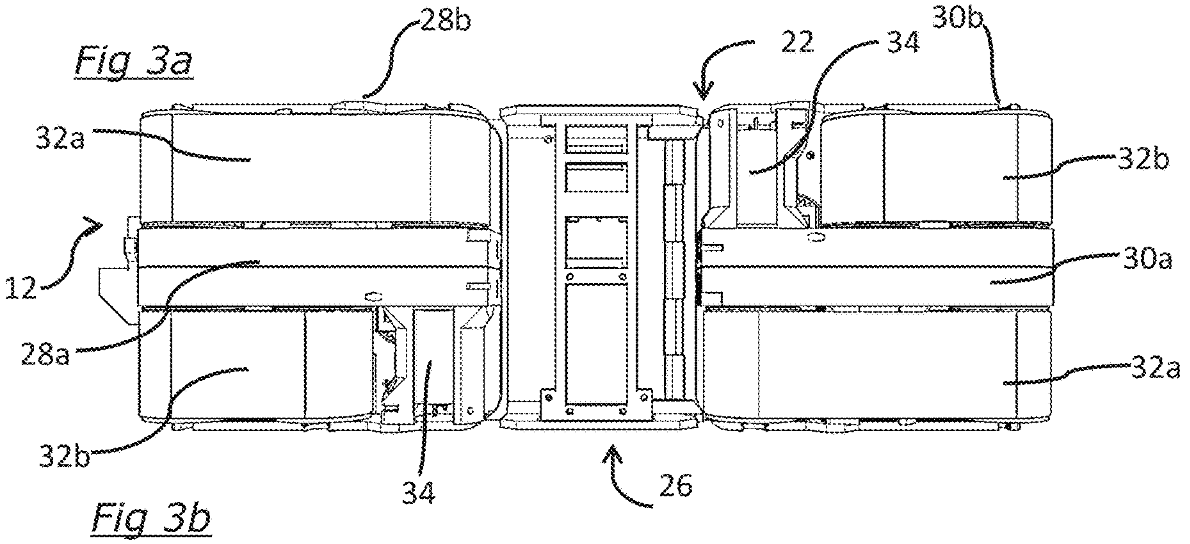
FIGS. 3(*a*), 3(*b*) and 3(*c*) are bottom views of the footwear assembly of FIG. 2 in different states of rotational operation.
Figure 3B:
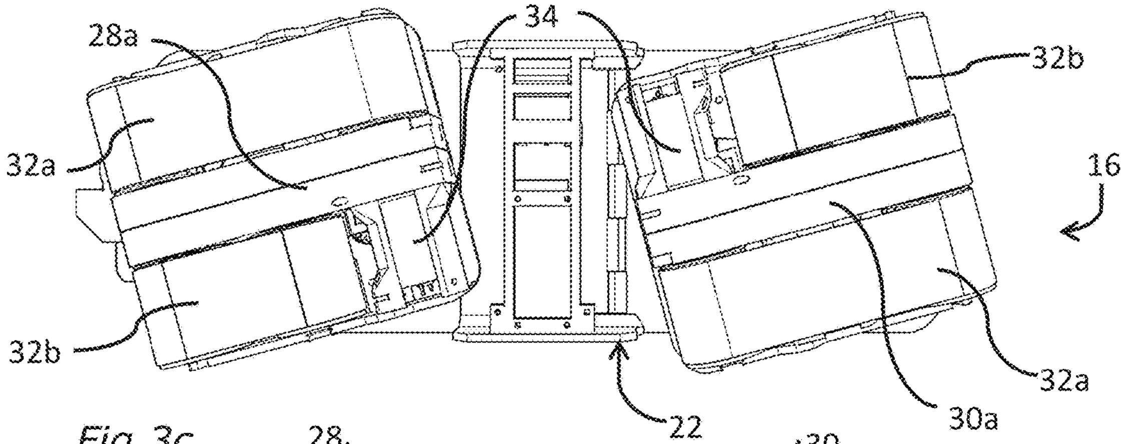
Figure 3C:
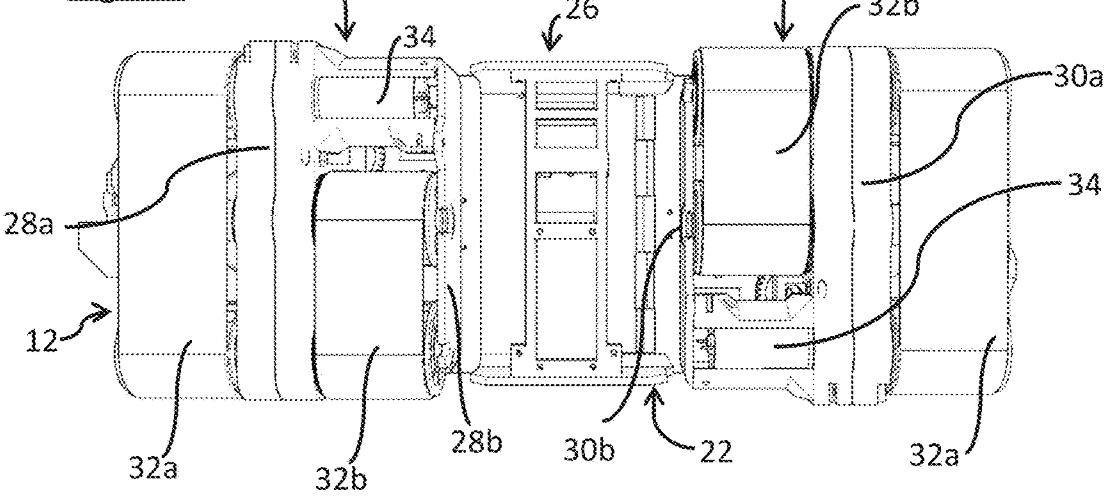

Referring now to FIGS. 3*a*, 3*b* and 3*c*, these all show the underside of the footwear assembly with the drive modules in different rotational positions, but all show the same main elements. Each drive frame has two continuous drive belts, one long one 32*a* and one shorter one 32*b* aligned substantially parallel to one another on each drive module; each belt extends in a continuous fashion around a drive wheel 36 and a pulley wheel 38 (shown in FIGS. 4 and 5), the drive wheels 36 being driven by a motor 34 coaxially aligned therewith so as to allow the drive belts to provide movement in a similar manner to a tank track or caterpillar track. The shorter drive belt 32*b* permits the drive motor 34 for that belt to be nested inside the longer drive belt 32*a*, making for a more compact arrangement in all three planes, allowing the height of the footwear assembly to be minimised. The drive wheels 36 are preferably located towards the centre of the footwear assembly 10; this places the pulley wheels 38 at the extreme front and rear ends of the footwear assembly, and is preferred because the pulley wheels are designed to handle a greater load (the maximum load on the drive wheels is limited by the maximum radial load on the motor shaft; the pulley wheels can handle a greater load due to multiple larger bearings with higher load ratings). Any impact suffered by the footwear assembly through walking is most likely to occur at the front and rear ends, and if damaged by such an impact the pulley wheels 38 are replaceable at less cost than are the drive wheels 36 and particularly the drive motors therefor. In FIG. 3*a* the front and rear drive modules 30, 28 are aligned longitudinally with the footwear assembly, in FIG. 3*b* they are both turned at an angle in one direction to the same extent, and in FIG. 3*c* they are both turned in the same direction to a maximum of 90°, which allows the footwear assemblies to compensate for a sidestepping movement. The drive modules need only rotate through 90° to be able to compensate for a range of 360° of movement by a user's foot, because the drive belts can be driven in reverse. The drive belts 32*a*, 32*b* on each drive module are normally driven in the same direction, but just as is well-known in tank tracks they can additionally or alternatively be driven at different speeds or in different directions so as to permit a turning motion.

The drive frames 28*a*, 30*a* support the motors 34, drive wheels 36 and pulley wheels 38 and, when combined with the drive module cover 30*b* provide a strong and rigid support for the wheels on each side. The frames and chassis also provide channels for routing wires and cables, and space (mainly in the centre of the chassis, between the two drive frames) for locating electronics, sensors, and receiver/transmitters for communicating with an external VR computer 40 (shown in FIG. 1*a*). The footwear assembly is powered by a rechargeable battery pack 42 (shown in FIG. 2) mounted behind the heel cup 14.

Figure 4:
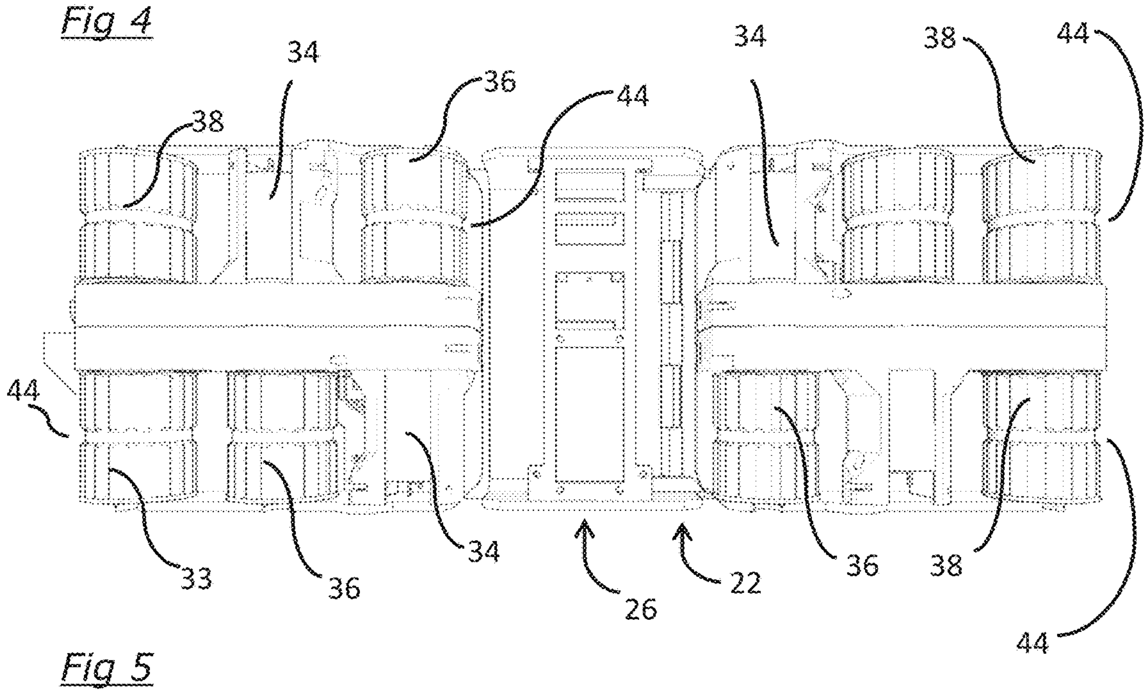
FIG. 4 is a bottom view of the footwear assembly of FIG. 2 with belts removed.
Figure 7:
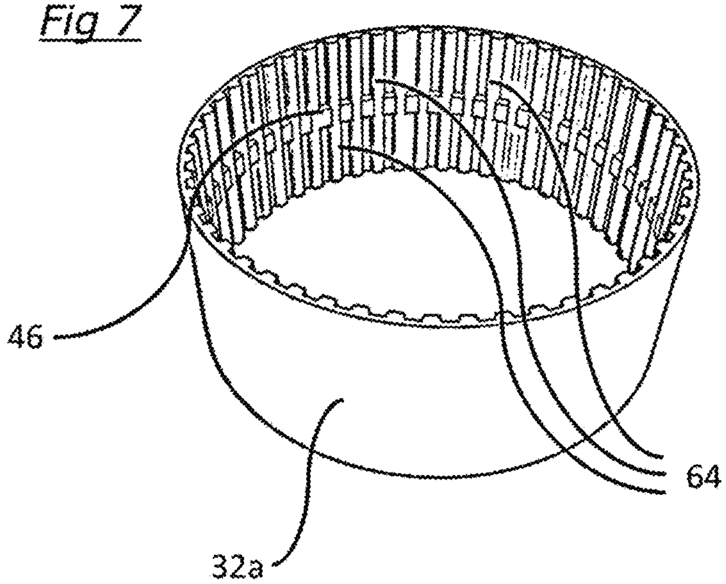
FIG. 7 is a perspective view of a drive belt.
Figure 9:
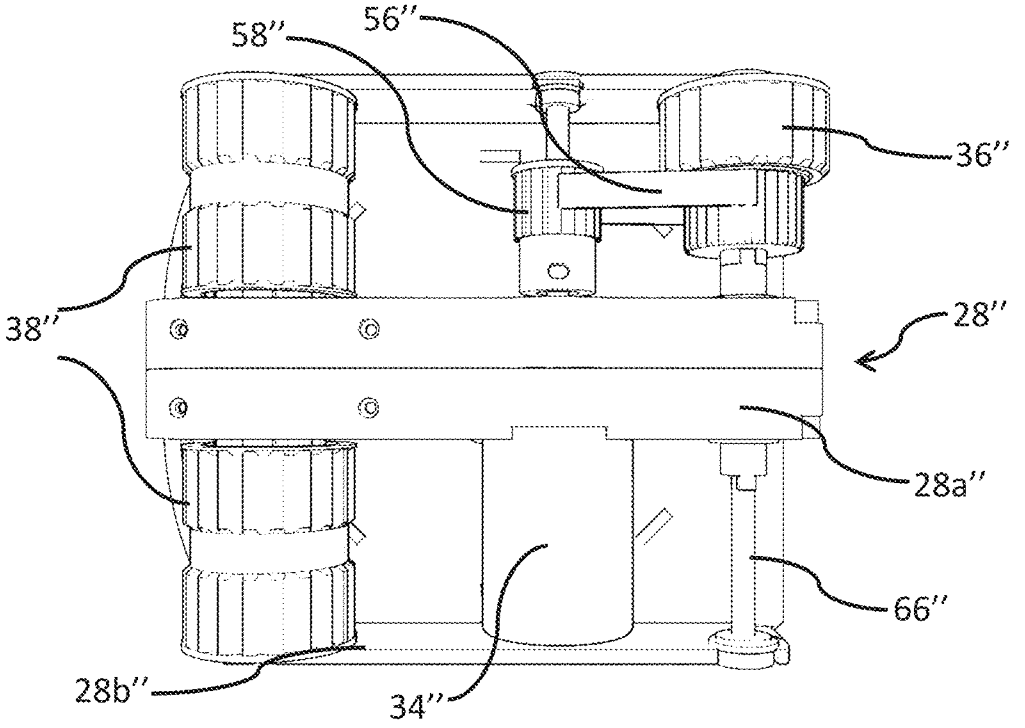
FIG. 9 is a bottom schematic view of an alternative arrangement of a drive module for alternative embodiments of VR footwear assemblies in accordance with the invention.

Turning to FIG. 4, this shows the footwear assembly from the underside, with the drive belts removed. The drive wheels 36 and pulley wheels 38 are transversely splined to engage with transverse ribs 64 formed on the interior of each belt (see the exemplary belt 32*a* shown in FIG. 7) and ensure minimum slippage when the belts are driven; there is also a circumferential channel 44 formed in each wheel, and these are aligned longitudinally with respect to the footwear assembly. The function of these channels 44 is to engage with and retain a rib 46 (see FIGS. 5 and 7) formed on the internal surface of each belt, so as to prevent the belts from slipping transversely off the wheels during turning.

One of the objectives of the VR footwear assembly design is to support the weight of a person (i.e. about 100 kg), this is the load that each VR footwear assembly is designed to handle. This weight is distributed across a total of eight Pulleys, where each pair of wheel pulleys (forward and rear) is designed to cope with the largest dynamic loads. The four motors generate a high torque relative to their size, which is transferred through four independent belts. The speed of each motor is regulated using a feedback signal and a PID control loop. There are a number of advantages to this design, compared to a design with one or two motors: the compact arrangement of four motors allows the device to have a low profile (~45 mm from ground excluding the heel cup 14 and battery pack 42). Such a low profile and even mass distribution within the device, together with the large surface contact area provided by the belts, results in a stable platform to walk-on, with high surface traction.

Figure 5:
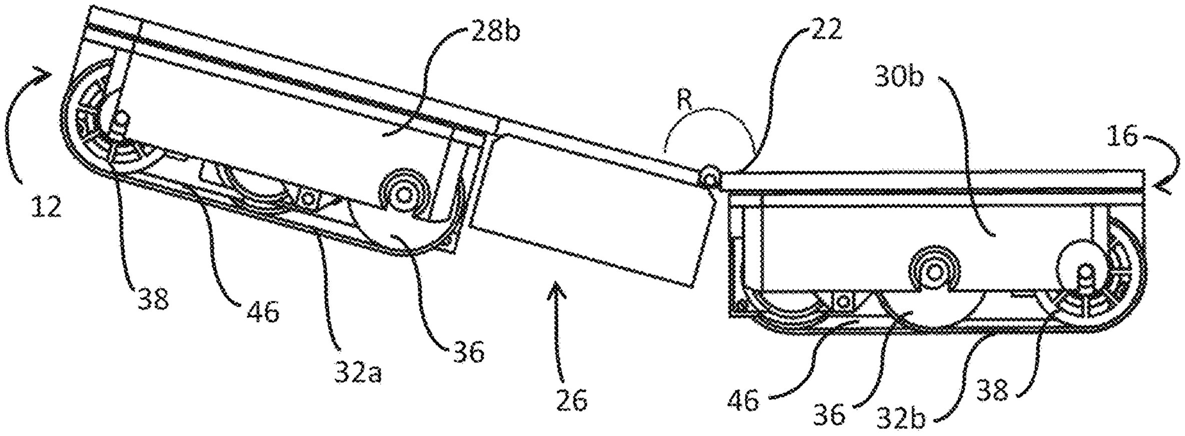
FIG. 5 is a side elevation schematic view illustrating how the footwear assembly flexes during walking.

FIG. 5 shows the chassis 26 of the footwear assembly schematically from the side, omitting the flexible platforms 18, 20, and it can be seen that the chassis 26 is hinged at 22 to allow the chassis 26 to bend along with the user's foot (not shown). The range of movement R of the hinge 22 is limited by end-stops to prevent rotation beyond set limits, with the hinging range being between 0° and about 45° maximum.

Figure 6A:
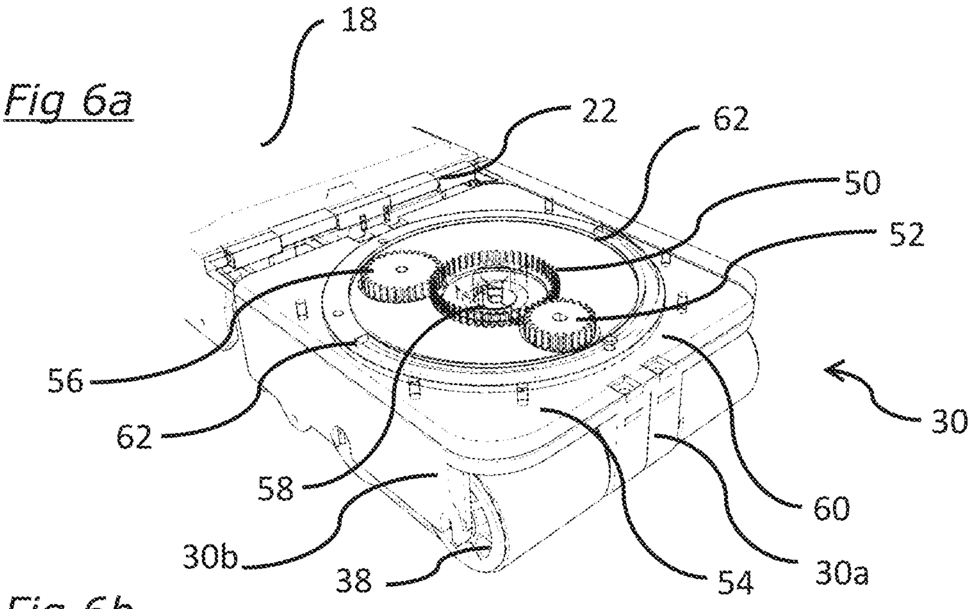
FIGS. 6, 6*b* and 6*c* are perspective views of the front end of the footwear assembly of FIG. 2, with the front platform removed.
Figure 6B:
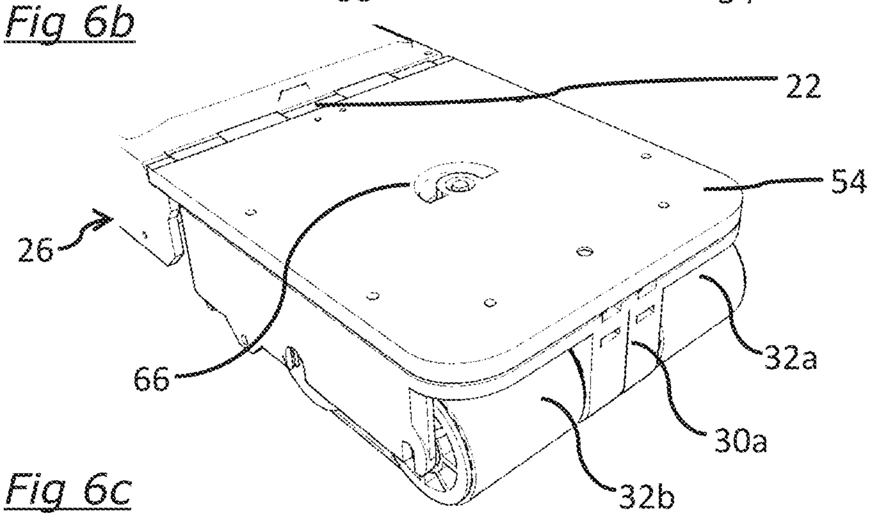
Figure 6C:
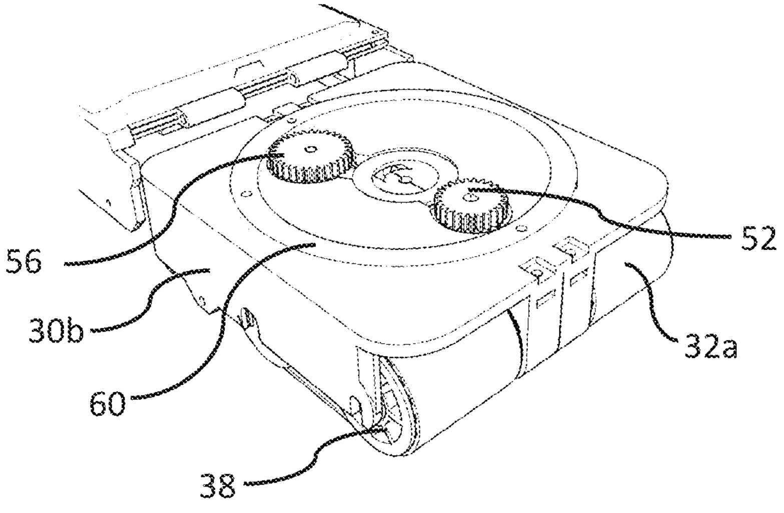

FIG. 6*a* shows the front end of the footwear assembly with the front flexible platform 20 removed and the front chassis 54 shown as transparent so the rotational drive arrangement for the front drive module 30 can be seen (that for the rear drive module 28 is essentially the same). FIG. 6*b* shows the same view as FIG. 6*a*, but here the front chassis 54 is opaque; FIG. 6*c* is again the same view, but with the front chassis removed. The drive module 30 rotates using a simple arrangement of spur gears. A larger, central gear 50 is attached to the lower surface of the front chassis 54 (not shown in FIG. 6*b* or 6*c*) and a smaller gear 52 connects to the turn motor (not shown, within the drive module cover 30*b*) mounted within the front drive frame 30*a*. A third gear 56 which may be offset from the centre, connects to a rotational sensor (not shown); the rotational sensor may be a potentiometer (variable resistor), however other sensor types such as magnetic or optical sensors would also work in this application. A potentiometer has the advantage of being low cost. Various types of gears could be used in this application; spur, helical, herringbone and/or bevel. There is a channel 66 through the front chassis 54 and the central gear 50 that allows wires to pass through. The front drive frame 30*a* and the front chassis 54 are held together by a central bolt (not shown). The weight (load) of the user is transferred through a central support ring 58 and an outer support ring 60, which is fixed to the drive module cover 30*b*. Grub screws or pins 62 extend through a channel in the front chassis 54 to provide physical end stops to rotation of the drive module 30 at +90° and −90°.

Figure 8A:
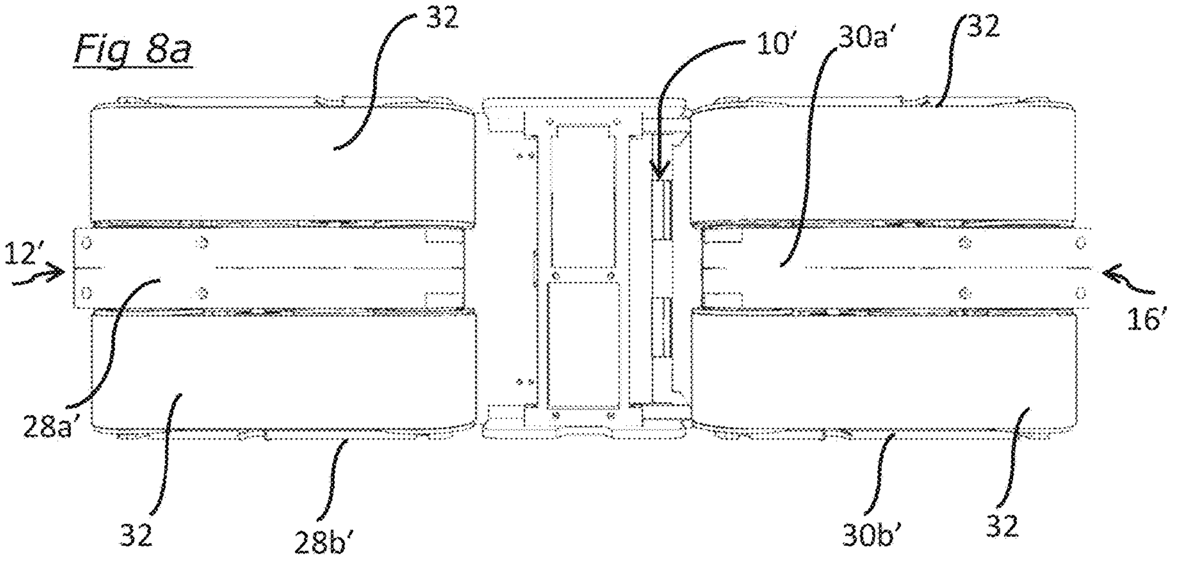
FIGS. 8*a* and 8*b* are bottom views of a second embodiment of a VR footwear assembly in accordance with the invention.
Figure 8B:
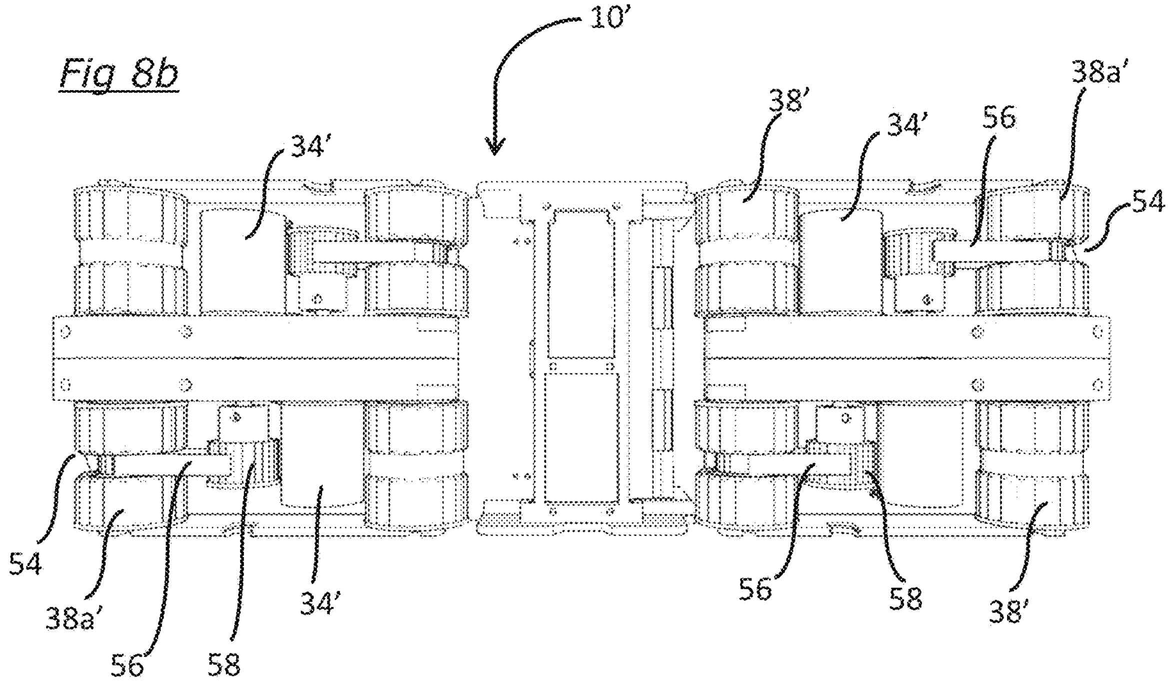

FIGS. 8*a* and 8*b* are views similar to those of FIGS. 3*a* and 4, respectively, of a second embodiment of a footwear assembly 10' in accordance with the invention. This embodiment is similar in many ways to the first embodiment, but it has different belt and drive arrangements which will now be described (it should be understood that other aspects of the design and operation of the second embodiment are the same as in the first embodiment, some of which are referenced by a similar but hyphenated reference numeral in the drawings). As can be seen in FIG. 8*a*, there are four belts 32 on each assembly 10', two on each drive module as in the first embodiment, but in this embodiment the belts on each drive module are of equal length. Unlike the first embodiment, in this embodiment the motor does not drive a wheel which engages with the belt, but instead has an indirect drive arrangement. Each belt 32 has transverse ribs on its interior surface, as in FIG. 7, and runs between a first pulley wheel 38' and a second pulley wheel 38*a'*, both of which are transversely splined to engage with the ribs on the inside of the belt 32. The second pulley wheel 38*a'* for each belt has a central cylindrical portion 54 of smaller diameter than the remainder of the wheel, and this central portion is also transversely splined. The second pulley wheel 38*a'* is driven by way of a motor 34' driving a primary drive belt 56 which is sufficiently narrow to fit within the smaller diameter portion, and has transverse ribs on its interior surface which are sized and configured to engage with the splined central portion 54 of the pulley wheel 38*a'*, and also with a transversely-splined drive wheel 58 which is directly driven by the motor 34'. The motor and the drive wheel share an axle (not shown) which extends transversely through the associated drive frame 28*a'* or 30*a'* so that the drive wheel 38 is located within the belt 32 on one side of the drive frame and the motor 34' is located within the belt on the other side of the drive frame (note that the belt 56 is shown only partially in FIG. 8*b*, so that the splines on the drive wheel 58 and on the central portion 54 of pulley wheel 38*a'* are not obscured).

The rear drive module 28" (which could equally be a front drive module) shown schematically from beneath with both continuous drive belts and one drive wheel removed for clarity has a single drive motor 34" which, as with the embodiments described above, drives one splined drive wheel 36" to drive the continuous belts (not shown) via a transversely-splined drive wheel 58 and a toothed primary drive belt 56". The illustrated drive wheel 36" is fixed to one end of a shaft 66" extending transversely across the drive module 28" and which is rotatably supported by bearings (not shown) within the drive assembly 28*a"* and/or the drive frame cover 28*b"*. The other drive wheel (not shown for clarity) is fixed to the other end of the shaft 66", so that as the motor 34" drives the belt 56" and the drive wheel 36", the drive wheel on the other side of the drive module is driven in unison so that both continuous drive belts are driven together.

The footwear assembly described above is normally one of a pair for each user and has the following features and characteristics:

- It operates wirelessly, is compact and easily stored
- It allows a natural walking experience and stable movement without requiring a harnesses
- It can accommodate a fast walk: at least 1.2 m/s, and fully omni-directional with side-stepping (strafing)
- It has built-in 2D surface tracking and positional correction
- It can keep users within a small play area, approximately 1.1×1.1 m for example.
- There can be angular motion sensing for body direction.
- SteamVR integration (OpenVR/OpenXR) and possible support for Oculus Quest.
- It is lightweight, at about 1.2 kg per shoe, and it is comfortable and of ergonomic design
- Each footwear assembly can allow approximately 2 hours use with built-in battery, more with an optional waist mounted battery
- It employs high performance long lasting Brushless DC motors.

Each VR footwear assembly can be configured to be worn either directly on a user's foot, where a cushioned sole is attached to the upper surface of the platform, or alternatively the footwear device may be strapped to a person that is wearing normal shoes, in which case the cushioned sole may be removed by the user and shoes placed directly onto the platform, and held in place using a system if straps. The cushioned sole is designed to provide comfort as well as keeping the user's foot in the correct position, additionally multiple straps hold the foot onto the device.

It will of course be understood that many variations may be made to the above-described embodiments without departing from the scope of the present invention. For example, the heel cap and/or platforms may incorporate means to adjust for different foot sizes, so that the assemblies can be easily adapted for use by other users. The platforms are shown as flat but they could be moulded to accept lower surface of the foot, to provide a more comfortable fit. The battery pack may be located in a different location than as shown, for example it may be located under the heel support and re-configured as a flattened battery pack; the same applies to the electronics/sensor/transmitter receiver elements, these may also move from the central chassis location, such as by being located behind the heel cup, packaged as a small box. Whilst the footwear assembly has been described in connection with VR equipment, this is not essential; the VR footwear assembly could be used without AR/VR equipment, for example rehabilitation in Health Care, where this type of locomotion system is used by patients regaining the ability to walk. The upper platforms 18, 20 which are intended for a foot, may be swapped/exchanged for different platforms designed to accommodate a shoe with fixings and straps as appropriate. The heel cup 14 may be mounted to the rear end 12 by way of a slide arrangement or the like so that the position of the heel cup on the rear end can be adjusted in a forward or rearward direction; this allows the footwear assembly to fit and be used by persons having smaller or bigger feet. The pulley and/or drive wheels may be adjustably mounted so as to place the continuous belts under tension, and the directly driven drive wheel may be similarly adjustable to tension the primary drive belt. The outer surface of each belt is shown in the drawings as smooth, but there may be a tread pattern (such as simple transverse ribs, or a more complicated configuration) provided to improve traction. The drive modules in a footwear assembly may be any combination of any of the different drive modules shown in FIGS. 4, 8*a* and 8*b* and 9. For example, a VR footwear assembly may comprise a front drive module with one drive motor and a rear drive module with two drive motors, or vice versa, and the drive module with the two drive motors may have equal or unequal length drive belts; alternatively, the drive modules in a footwear assembly may all be of the same type.

Where different variations or alternative arrangements are described above, it should be understood that embodiments of the invention may incorporate such variations and/or alternatives in any suitable combination.

The invention claimed is:

1. A footwear assembly for use in a virtual reality environment comprising a front platform portion having an upper surface adapted and configured for supporting and releasably retaining the forward part of a user's foot and a rear platform portion having an upper surface adapted and configured for supporting and releasably retaining a rear part of the user's foot, the front and rear platform portions being joined by a transverse hinge so that the platform portions pivot relative to one another in the longitudinal plane to accommodate flexing of the user's foot, in which each platform portion has mounted to a lower surface thereof at least one drive motor, each drive motor driving a continuous belt, and two continuous belts on each platform portion being arranged substantially in parallel, one located to each side of the platform portion, and in which the drive motor or motors and continuous belts of the front platform portion are mounted to a front drive module and the drive motor or motors and continuous belts of the rear platform portion are mounted to a rear drive module, the drive modules being mounted beneath their respective platform portions so each drive module may rotate in the horizontal plane relative to the platform portion it is mounted beneath.

2. The footwear assembly as claimed in claim 1, further comprising a front turn motor adapted to selectively rotate the front drive module relative to the front platform portion and a rear turn motor adapted to selectively rotate the rear drive module relative to the rear platform portion.

3. The footwear assembly as claimed in claim 2, in which the rotational movement of the drive modules is constrained to a maximum of 90° in either direction from the longitudinal plane.

4. The footwear assembly as claimed in claim 2, in which the turn motors are coupled to a position sensor.

5. The footwear assembly as claimed in claim 1, in which the turn motors are adapted to drive the two drive modules to rotate so that they remain aligned and parallel as they rotate.

6. The foot wear assembly as claimed in claim 1, in which at least one motor on each platform portion is located within a continuous belt.

7. The footwear assembly as claimed in claim 1, in which the continuous belts on each drive module are of different lengths.

8. The footwear assembly as claimed in claim 7, in which the shorter continuous track under the front platform portion is aligned longitudinally on the same side of the front platform portion as the longer continuous belts under the rear platform portion.

9. The footwear assembly as claimed in claim 1, in which each continuous belt extends between at least one drive wheel having axial ribs and at least one pulley wheel having axial ribs, in which an inner surface of each continuous belt has transverse ribs which are complementary to the ribs on the drive wheel and pulley wheel, and in which the inner surface of the continuous belt has a longitudinal rib extending longitudinally over substantially the entire inner surface of the belt.

10. The footwear assembly according to claim 9, in which circumferential channels are provided in the drive wheel and the pulley wheel, the longitudinal rib being located and configured so as to fit within these channels.

11. The footwear assembly according to claim 10, in which the drive wheel and/or the pulley wheel is formed of a pair of separate, axially-spaced ribbed wheels, the circumferential channels being provided by the axial spacing of the pair of wheels.

12. The footwear assembly as claimed in claim 10, in which the transverse size of the longitudinal rib is less than the axial size of the circumferential channels.

13. A system for use in a virtual reality environment comprising a pair of footwear assemblies as claimed in claim 1, each footwear assembly comprising a transmitter/receiver for transferring data between assemblies and/or between the assemblies and an external VR environment computer.

14. The system according to claim 13 which is adapted to calculate a correction vector representing the distance and direction between the actual coordinate of the center of the user's body and the origin (starting position) coordinate at least once for every stride (or single step) made by each foot.

15. The system according to claim 14 which is adapted to utilize the correction vector and the actual heading of each VR footwear assembly to calculate a rotation angle of each drive module and to adjust the speed of the drive motors, to gradually return the user to the user's original starting position.

* * * * *